United States Patent
Edgren

(10) Patent No.: US 7,529,520 B2
(45) Date of Patent: May 5, 2009

(54) ELECTRO-ACOUSTIC TRANSDUCER FOR A PORTABLE COMMUNICATION DEVICE

(75) Inventor: Anders Edgren, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 127 days.

(21) Appl. No.: 10/589,252

(22) PCT Filed: Jan. 20, 2005

(86) PCT No.: PCT/EP2005/000523

§ 371 (c)(1),
(2), (4) Date: Aug. 11, 2006

(87) PCT Pub. No.: WO2005/079045

PCT Pub. Date: Aug. 25, 2005

(65) Prior Publication Data

US 2007/0161354 A1     Jul. 12, 2007

(30) Foreign Application Priority Data

Feb. 12, 2004  (EP) .................. 04003111

(51) Int. Cl.
*H04B 1/38* (2006.01)
(52) U.S. Cl. ............. 455/90.3; 455/556.1; 455/557; 455/575.1; 455/567
(58) Field of Classification Search ......... 455/557, 455/575.1, 567, 575.3, 90.1, 566, 90.3, 575.4
See application file for complete search history.

(56) References Cited

U.S. PATENT DOCUMENTS

| | | | |
|---|---|---|---|
| 6,002,949 A * | 12/1999 | Hawker et al. | ........... 455/569.1 |
| 7,139,394 B2 | 11/2006 | Dufosse et al. | |
| 2002/0136398 A1 * | 9/2002 | Dufosse et al. | ........ 379/428.01 |
| 2003/0022702 A1 * | 1/2003 | Usuki et al. | ................. 455/567 |

(Continued)

FOREIGN PATENT DOCUMENTS

EP    0 909 110 A2    4/1999

(Continued)

OTHER PUBLICATIONS

International Search Report mailed on Apt. 27, 2005.

(Continued)

*Primary Examiner*—Tan Trinh
(74) *Attorney, Agent, or Firm*—Harrity & Harrity, LLP

(57) ABSTRACT

The present invention relates to an electro-acoustic communications unit (10) and a portable communication device (20, 30) for producing a desired frequency characteristics in alert mode and phone mode, comprising a housing with a wall (12) defining an interior, having a certain volume and an exterior of the housing, an acoustic driver (14) for generating acoustic signals, said acoustic driver (14) being mounted to the wall (12), an acoustic port (16, 26), having a length and a cross-sectional area, said port (16, 26) penetrating the wall (12) and connecting the interior of the housing with the exterior of said housing, where the volume, length and cross-sectional area are dimensioned in relation to the acoustic driver (14) in a way such that said electro-acoustic communications unit achieves a desired frequency characteristics when engaging the exterior end (22, 32) of said acoustic port of the communications unit with a user's ear (18).

11 Claims, 1 Drawing Sheet

U.S. PATENT DOCUMENTS

| | | | |
|---|---|---|---|
| 2004/0043801 A1* | 3/2004 | Shimokawatoko et al. | 455/575.3 |
| 2004/0142730 A1* | 7/2004 | Sasaki | 455/566 |
| 2004/0198240 A1* | 10/2004 | Oliveira | 455/90.1 |
| 2006/0116180 A1* | 6/2006 | Minervini | 455/575.1 |

FOREIGN PATENT DOCUMENTS

| | | |
|---|---|---|
| EP | 1 244 277 A1 | 9/2002 |
| EP | 1 244 331 A1 | 9/2002 |
| GB | 2 310 559 A | 8/1997 |
| GB | 2 317 069 A | 3/1998 |
| WO | WO 00/27096 | 5/2000 |
| WO | WO 01/33904 A1 | 5/2001 |

OTHER PUBLICATIONS

International Preliminary Report on Patentability mailed on May 3, 2006.

* cited by examiner

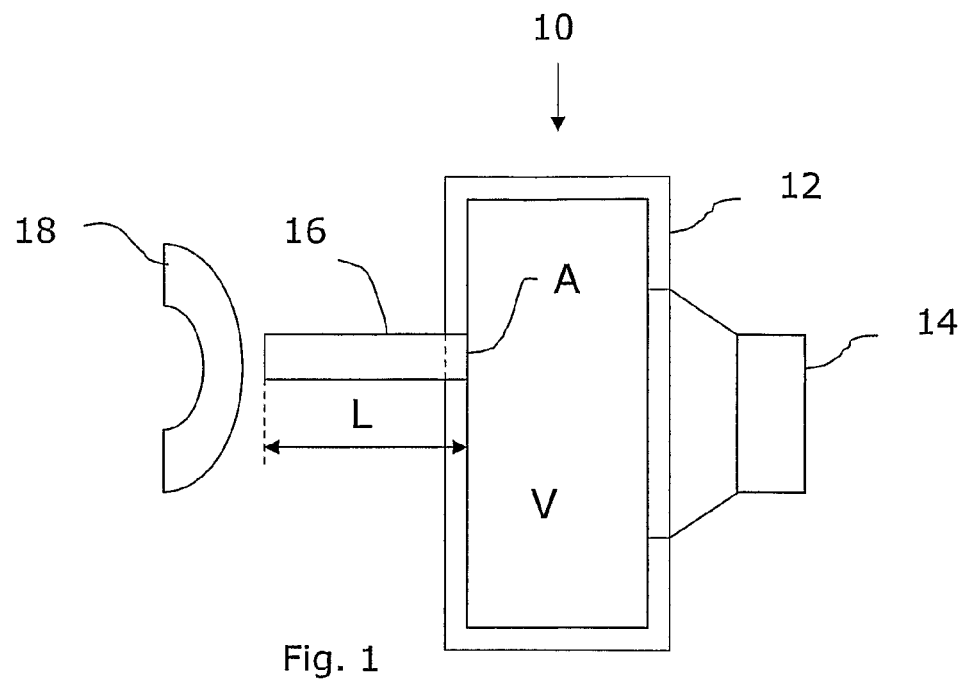
Fig. 1
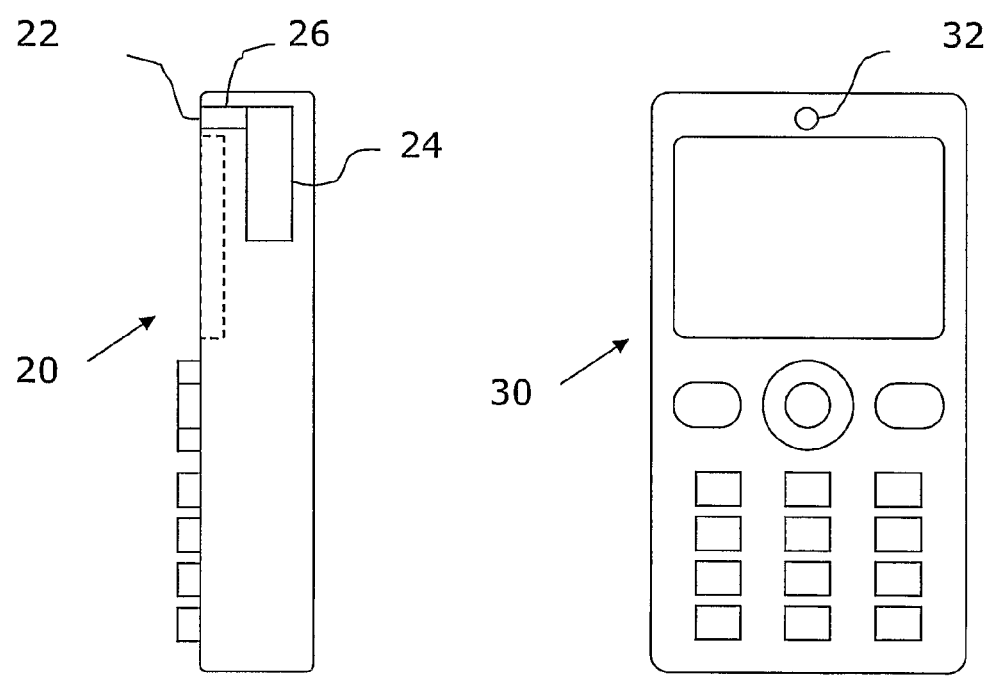
Fig. 2
Fig. 3

ELECTRO-ACOUSTIC TRANSDUCER FOR A PORTABLE COMMUNICATION DEVICE

TECHNICAL FIELD OF THE INVENTION

The present invention relates to an electro-acoustic communications unit and a portable communication device for producing a desired frequency characteristics in alert and phone mode.

DESCRIPTION OF RELATED ART

A portable communications unit, for instance of the type of a mobile phone, should be able to produce two types of acoustic signals, the alert type (high level) of signals in alert operation mode and the phone type (low level) of signals, typically the voice of the person to whom the user of said portable communications device is communicating, in phone operation mode. In order to produce acoustic output signals at these two different levels two different transducers have traditionally been used. However, since the reproduction demands of the alert signal have risen in connection with polyphonic ring signals, and since the importance of small sizes of the mobile phones has augmented, portable communications units, containing one transducer only, have been presented.

In order to produce the two levels of acoustic signals, the same transducer is excited with two different electric signal levels. Also, in the phone mode the user typically holds the mobile phone against his/her ear, whereas in the alert mode the mobile phone is typically not held against someone's ear, but rather placed so that the mobile phone can send the acoustic signals into free air space. This difference of what the transducer faces in the phone mode as compared to the alert mode, means that the mobile phone experiences two different impedances, in an impedance representation of the respective systems.

The international patent applications WO98/24214, WO0133904 and WO00/21330, to Andersen, and the european patent application to Backman, all present attempts to minimize such impedance differences, by introducing various openings in a housing containing the respective transducer, in order to achieve a system that is so called "leak-tolerant", i.e. tolerant to air leakages between a user's ear and the face on the communication device designed to be held against said user's ear. These patent applications propose various ways to connect the transducer to the air surrounding the respective transducer.

However, this kind of approach gives rise to distortion either when the transducer is driven in alert mode or when it is used in phone mode. This is due to impedance mismatch and the approach, to minimize the influence of the user's on the performance of a communications device, is not adequate in order to achieve an essentially distortionless performance in both alert and phone mode of said portable communication device.

There is thus a need for providing an electro-acoustic communications unit that is capable of producing acoustic signals in alert mode and in phone mode with a desired frequency performance, essentially without distortion.

SUMMARY OF THE INVENTION

The invention is thus directed towards solving the problem of providing an electro-acoustic communications unit presenting a desired frequency characteristics, essentially without distortion, despite the impedance differences experienced by the unit in alert mode as compared to phone mode.

A solution to this problem is achieved by actively making use of the change in the impedance of the acoustic port caused by holding said electro-acoustic communications unit close to a user's ear.

A first object of the present invention is to provide an electro-acoustic communications unit that actively makes use of the change in impedance of the acoustic port caused by holding said electro-acoustic communications unit close to a user's ear.

According to one aspect of this invention, this object is achieved by an electro-acoustic communications unit, comprising: a housing with a wall defining an interior, having a certain volume, and an exterior, an acoustic driver for generating acoustic signals, said acoustic driver being mounted to the wall, and an acoustic port, having a length and a cross-sectional area, said port penetrating through the wall and connecting the interior of the housing with the exterior of said housing, where the volume, length and cross-sectional area are dimensioned in relation to the acoustic driver in a way such that said electro-acoustic communications unit achieves a desired frequency characteristics when engaging the exterior end of said acoustic port of the communications unit with a user's ear.

A second aspect of the present invention is directed towards the electro-acoustic communications unit including the features of the first aspect, wherein the housing defined by the wall is tightly sealed.

A third aspect of the present invention is directed towards the electro-acoustic communications unit including the features of the first aspect, wherein the acoustic driver has an interior side and an exterior side, with respect to the wall, and that the interior side of the driver drives acoustic signals into the interior of the housing.

A fourth aspect of the present invention is directed towards the electro-acoustic communications unit including the features of the third aspect, wherein the acoustic port makes use of the acoustic signals driven into the interior of the housing.

A fifth aspect of the present invention is directed towards the electro-acoustic communications unit including the features of the third aspect, wherein the acoustic signals generated by the exterior side of the driver, are directed to dissipate without being used by the user.

A sixth aspect of the present invention is directed towards the electro-acoustic communications unit including the features of the first aspect, wherein the volume is of the order a few between 0.5 and 10 cubic centimeters ($cm^3$), the length of the acoustic port of the order of a few between 0.5 and 20 centimeters (cm) and the cross-sectional area of the order of between 1 and 120 square millimeters ($mm^2$).

A second object of the present invention is to provide a portable communication device that actively makes use of the change in impedance of the acoustic port caused by holding said portable communications device close to a user's ear.

According to the seventh aspect of this invention, this object is achieved by a portable communication device, comprising the electro-acoustic communications unit having a housing with a wall defining an interior, having a certain volume, and an exterior, an acoustic driver for generating acoustic signals, said acoustic driver being mounted to the wall, and an acoustic port, having a length and a cross-sectional area, said port penetrating through the wall and connecting the interior of the housing with the exterior of said housing, where the volume, length and cross-sectional area are dimensioned in relation to the acoustic driver in a way such that said electro-acoustic communications unit achieves a desired frequency characteristics when engaging the exterior end of said acoustic port of the communications unit with a user's ear.

An eighth aspect of the present invention is directed towards the portable communication device including the features of the seventh aspect, wherein the device is a mobile phone.

A ninth aspect of the present invention is directed towards the portable communication device including the features of the seventh aspect, in which the acoustic signals generated by an exterior side of the driver, with respect to the housing wall, are attenuated by said device.

The present invention has the following advantages:

Firstly, the main merit is that electric signals can be reproduced as acoustic signals both in alert and phone mode essentially without distortion.

Secondly, as the above reproduction can be achieved by using one transducer only, space is saved within any device containing said electro-acoustic communications unit. Also, since the acoustic port typically has a diameter smallar than that of the transducer itself, and that the useful acoustic signals are forwarded by said port, exterior area space is saved, that in general is occupied by the transducer area.

Thirdly, since one transducer can be used instead of two, the transducer cost can be reduced.

Worth noting is that combining two functions in the same communications unit, often result in a compromise of both functions. The paradox with the preferred embodiment of the present invention is that both modes are improved as compared to that of an individual stand alone configuration.

BRIEF DESCRIPTION OF THE DRAWINGS

The present invention will be clearly understood from the following description of the preferred embodiments of the present invention, read in conjunction with the attached drawings in which:

FIG. 1 presents an electro-acoustic communications unit according to a preferred embodiment of the present invention.

FIG. 2 shows a side-view of a portable communication device according to a preferred embodiment of the present invention, in the form of a mobile phone.

FIG. 3 shows a front-view of a portable communication device according to a preferred embodiment of the present invention, in the form of a mobile phone.

DETAILED DESCRIPTION OF THE EMBODIMENTS

The present invention relates to an electro-acoustic communications unit and a portable communication device for producing a desired frequency characteristics in alert and phone mode. It is also directed to solving the problem of providing said electro-acoustic communications unit and said portable communication device presenting a desired frequency characteristics, despite the impedance differences experienced by the unit, itself or within the device, in alert mode as compared to phone mode.

With reference to FIG. 1, showing a communications unit according to a preferred embodiment of the present invention, said invention will now be described in more detail.

The electro-acoustic communications unit, 10, as presented in FIG. 1, comprises a housing defined by a wall, 12, an acoustic transducer, 14, and an acoustic port, 16, which port connects the interior of the housing to the exterior of the housing. In FIG. 1, a human ear, 18, placed in close proximity to the external end of the acoustic port, is also schematically presented.

The housing defined by the wall, 12, of the electro-acoustic communications unit, 10, is a sealed housing having an interior with a volume, V. The housing is however designed with two holes, of which the acoustic port, 16, penetrates the wall, 12, through one of said two holes, and of which the other hole is provided to be covered by the acoustic transducer, 14, mounted to the wall, 12. The housing formed by the wall, 12, is preferably tightly sealed, that is air tight, in order to achieve the desired frequency characteristics and highest sensitivity of the electro-acoustic communications unit according to a preferred embodiment of the present invention.

As is clearly shown in FIG. 1, the acoustic transducer, 14, is mounted to the wall, 12, covering one of said two holes, so that the acoustic signals generated by one side of the acoustic transducer are transmitted into the volume of the housing. The acoustic signals that are not transmitted into the volume, V, but rather generated by the opposite side of the acoustic transducer are not useful and are hence not used in the present invention.

These acoustic signals can for instance be attenuated by attenuating means or by an outer shell of a communications device, in which the electro-acoustic communications unit, 10, is placed.

In FIG. 1, the acoustic port, 16, penetrating the wall, 12, is mounted on a side of the wall, 12, which side is opposite to the side of the wall, 12, of the transducer, 14. The port, 16, can however be mounted on any side of the wall, 12, as long as the acoustic port, 16, penetrates said wall, 12.

According to the present invention the impedance difference mentioned above is actively taken into account and represents the key to this solution of the problem of providing an electro-acoustic communications unit, with which an essentially distortionless performance in both alert and phone mode, is achieved.

By properly designing the electro-acoustic communications unit according to a preferred embodiment of the present invention, said unit can be tuned to achieve a desired frequency characteristics of the output acoustic signals from the acoustic port.

The design of the electro-acoustic communications unit improves the performance of the alert as well as the phone mode. The alert mode improvement enables high acoustic signal sound pressures without huge cone excursions that cause distortion. In the alert mode the acoustic port, 16, is used as is, that is the impedance of the acoustic port itself is utilized. The improvement of the phone mode, realized by making use of the impedance influence by the user's ear close to the acoustic port, of the device held close to the ear, is an increase of the high-frequency (up to approximately 3 kHz) performance level relative to the performance of a communications unit alone.

Also, the improvement of the phone mode is constituted by an improved low-frequency characteristics, that is an increase of the low-frequency level performance. For example, for a selected acoustic transducer the lower cut-off frequency, at which the acoustic signal intensity has decreased by for instance 3 dB, was lowered from ca. 750 Hz to ca. 300 Hz.

FIGS. 2 and 3, shows a side-view and a front view, respectively, of a portable communication device according to a preferred embodiment of the present invention, in the form of a mobile phone. The mobile phone, 20, of FIG. 2, contains an electro-acoustic communications unit, in which the housing, 24, and the acoustic port, 26 are shown. The cross-sectional area A is also indicated with 22. In FIG. 3 the cross-sectional area, 32, of the mobile phone, 30, is clearly shown.

The tuning of the electro-acoustic communcations unit according to the present invention is performed by using a method that is used for vented box solutions that is for bass-reflex loudspeakers systems.

The description is of a basic normal procedure on how to tune a loudspeaker housing with a reflex port, but with amendments on what to consider when one or more reflex ports are intended to work as an earphone wave-guiding port.

The following paragraphs will thus describe the tuning in more detail. Two parameters have to considered when selecting an acoustic transducer. These are the acoustic transducer's free field resonance frequency $f_o$ and its compliance $C_a$. A transducer having too high a resonance $f_o$ will not obtain a desired result. If the compliance $C_a$ is chosen too high it will infringe the dynamics and will not be possible to use for obtaining a desired result in the wave-guiding port. Having determined these parameters, a housing having an appropriate volume $V_{box}$ can be realised.

When mounted in the housing the acoustic transducer obtains a resonance frequency $f_{box}$ that has to be assessed such that the wave-guiding port can be calculated to create a Helmholtz resonator having an adequate resonance frequency $f_H$.

The Helmholtz resonance frequency $f_H$ has to be chosen in the interval between the transducer's free field resonance frequency $f_o$ and the housing's resonance frequency $f_{box}$. If this interval is very narrow, the the volume of the housing is probably too big and/or the transducer has too low a compliance $C_a$.

Moreover, the resonance $f_H$ and a damping $1/Q_H$ of the Helmholtz resonator have to be chosen in a way so that the transducer when being mounted still can reproduce low frequencies below the resonance frequency $f_H$. This is essential if the wave-guiding port is intended to work as an earphone feeder. If the acoustic transducer can not produce this these frequencies sufficiently well, the transducer has been wrongly chosen.

The ratio between the cross-sectional area, A, and the length, L, of the port is determined by using Helmholtz equation. The length, L, of the wave-guiding port can be adjusted to suit a desired application provided the cross-sectional area, A, is adjusted according to Helmholtz equation. This thus implies that the length of the port can be relatively freely chosen.

In a first example of an earphone model, according to the invention, an acoustic transducer having a diameter of ca. 15 mm was used. The volume of an adequate housing was determined to ca. 2 cm³, and the length and diameter of the acoustic port were detemined to 15 mm and 3 mm, respectively. In a second example using the same acoustic transducer and the same volume of the housing, the length and the diameter of the acoustic port were determined to ca. 110 mm and ca. 8 mm, respectively.

As indicated above, keeping the volume of the housing and the frequencies fixed, the individual values of the length and the cross-sectional area can be altered, provided that the ratio between the two, is kept fixed.

An interesting observation is that the desired frequency effect can be produced by using a wave-guiding port having an air volume 2.5 times the size of the volume, V, of the housing.

It is emphasized that this invention can be varied in many more ways, of which the alternative embodiments below only are examples of a few. These different embodiments are hence non-limiting examples. The scope of the present invention, however, is only limited by the subsequently following claims.

According to another embodiment of the present invention, multiple acoustic drivers are mounted in the housing, for generating the acoustic signals. Multiple acoustic transducer must for obvious reasons be considered in the dimensioning and tuning of the electro-acoustic communications unit.

According to another embodiment of the present invention, multiple acoustic ports are provided, between the interior and the exterior of the housing, penetrating the wall of the housing. This implies that the acoustic signals from the exterior end of these ports are taken into account in the dimensioning and tuning of the elctro-acoustic communications unit, and that acoustic signals from both ports are considered.

According to still yet another embodiment of the present invention, the housing is sealed but not tightly sealed. This has at least two consequences on the properties of the communications unit. One is that a leakage of useful acoustic signals is introduced, lowering the efficiency (output level) of the electro-acoustic communications unit. The other is that tuning of the system becomes more problematic since the leakage also influences the frequency performance of the unit. In case the leakage is known and controlled, the effect can be calculated, else it cannot.

The invention claimed is:

1. An electro-acoustic communications unit for producing frequency characteristics in an alert mode and a phone mode, comprising:
   a housing including a multi-sided wall defining an exterior of the housing from a substantially air-tight interior having a volume (V);
   an acoustic driver for generating acoustic signals, said acoustic driver being mounted to and penetrating a first side of the multi-sided wall, where a first end of the acoustic driver is within the interior of the housing and generates first acoustic signals directed to an acoustic port, and a second end of the acoustic driver is in the exterior of the housing and generates second acoustic signals to be dissipated and unused by the electro-acoustic communications unit; and
   the acoustic port having a length (L) and a cross-sectional area (A), said acoustic port penetrating a second side of the multi-sided wall and connecting the interior of the housing with the exterior of said housing, where the volume (V), the length (L), and the cross-sectional area (A) are dimensioned in relation to the acoustic driver such that said electro-acoustic communications unit achieves the frequency characteristics in the phone mode when engaging an exterior end of said acoustic port of the electro-acoustic communications unit with an ear of a user, where said frequency characteristics are provided in both the alert mode and the phone mode.

2. The electro-acoustic communications unit according to claim 1, where the volume (V) of the housing ranges from 0.5 and 10 cubic centimeters (cm³), the length (L) of the acoustic port ranges from 0.5and 20 centimeters (cm), and the cross-sectional area (A) of the acoustic port ranges from 1 and 120 square millimeters (mm²).

3. The electro-acoustic communications unit according to claim 1, where the electro-acoustic communications unit comprises a portable communication device.

4. The electro-acoustic communications unit according to claim 3, wherein where the portable communication device is a mobile phone.

5. The electro-acoustic communications unit according to claim 4, where said portable communication device is to attenuate the second acoustic signals generated by the second end of the acoustic driver.

6. The electro-acoustic communications unit according to claim 1, where no portion of the acoustic port extends into the interior of the housing.

7. The electro-acoustic communications unit according to claim 1, where the exterior end of the acoustic port is substantially flush with an exterior of the electro-acoustic communications unit and an opposite end of the acoustic port is substantially flush with an interior of the second side of the multi-sided wall.

8. The electro-acoustic communications unit according to claim 1, where the acoustic port is the only sound port extending from the interior of the housing.

9. The electro-acoustic communications unit according to claim 1, where the acoustic port is the only sound port of the electro-acoustic communications unit to engage the ear of the user.

10. The electro-acoustic communications unit according to claim 1, where the first side of the multi-sided wall opposes the second side of the multi-sided wall.

11. A method of providing frequency characteristics in an electro-acoustic communications unit, the method comprising:

providing a housing including a multi-sided wall defining an exterior of the housing from a substantially air-tight interior having a volume (V);

generating, by an acoustic driver mounted to and penetrating a first side of the multi-sided wall of the electro-acoustic communications unit, first acoustic signals from a first end of the acoustic driver disposed within the interior of the housing, and second acoustic signals from a second end of the acoustic driver disposed in the exterior of the housing, where the second acoustic signals are dissipated and unused by the electro-acoustic communications unit and the first acoustic signals are directed to an acoustic port; and providing the acoustic port with a length (L) and a cross-sectional area (A), said acoustic port penetrating a second side of the multi-sided wall and connecting the interior of the housing with the exterior of said housing, where the volume (V), the length (L), and the cross-sectional area (A) are dimensioned in relation to the acoustic driver such that said electro-acoustic communications unit achieves the frequency characteristics in the phone mode when engaging an exterior end of said acoustic port of the electro-acoustic communications unit with an ear of a user, where providing said frequency characteristics is achieved in both the alert mode and the phone mode.

* * * * *